United States Patent
Muthiah et al.

(10) Patent No.: US 11,954,367 B2
(45) Date of Patent: Apr. 9, 2024

(54) ACTIVE TIME-BASED COMMAND PRIORITIZATION IN DATA STORAGE DEVICES

(71) Applicant: Western Digital Technologies, Inc., San Jose, CA (US)

(72) Inventors: Ramanathan Muthiah, Bangalore (IN); Judah Gamliel Hahn, Ofra (IL); Rotem Sela, Hod Hasharon (IL)

(73) Assignee: Western Digital Technologies, Inc., San Jose, CA (US)

( * ) Notice: Subject to any disclaimer, the term of this patent is extended or adjusted under 35 U.S.C. 154(b) by 127 days.

(21) Appl. No.: 17/841,600

(22) Filed: Jun. 15, 2022

(65) Prior Publication Data
US 2023/0409236 A1 Dec. 21, 2023

(51) Int. Cl.
*G06F 3/06* (2006.01)
(52) U.S. Cl.
CPC .......... *G06F 3/0659* (2013.01); *G06F 3/0604* (2013.01); *G06F 3/064* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 10,417,190 B1* | 9/2019 | Donlan | G06F 16/128 |
| 11,126,378 B1 | 9/2021 | Parker et al. | |
| 2018/0321945 A1 | 11/2018 | Benisty | |
| 2020/0042236 A1 | 2/2020 | Subraya | |
| 2021/0109856 A1* | 4/2021 | Lee | G06F 12/0253 |
| 2021/0223994 A1 | 7/2021 | Kanno et al. | |
| 2021/0263674 A1 | 8/2021 | Shin et al. | |
| 2021/0303188 A1 | 9/2021 | Bazarsky et al. | |
| 2021/0318801 A1 | 10/2021 | Benisty et al. | |
| 2021/0318820 A1 | 10/2021 | Jin et al. | |
| 2022/0019370 A1 | 1/2022 | Bhardwaj | |
| 2022/0075716 A1 | 3/2022 | Tikoo et al. | |
| 2022/0083256 A1 | 3/2022 | Muthiah | |
| 2022/0137858 A1 | 5/2022 | Lee et al. | |

OTHER PUBLICATIONS

NVM Express, "Zoned Namespaces (ZNS) for NVMe", NVM Express, Aug. 15, 2018, 10 pages.
BjØrling, "From Open Channel SSDs to Zoned Namespaces", Western Digital, Jan. 23, 2019, 18 pages.
NVM Express, "Zoned Namespace Command Set Specification", NVM Express, Revision 1.1, Apr. 22, 2021, 48 pages.

* cited by examiner

*Primary Examiner* — Jane W Benner
(74) *Attorney, Agent, or Firm* — Morgan, Lewis & Bockius LLP

(57) ABSTRACT

Disclosed are systems and methods providing active time-based prioritization in host-managed stream devices. The method includes receiving a plurality of host commands from a host system. The method also includes computing active times of open memory regions. The method also includes determining one or more regions that have remained open for more than a threshold time period, based on the active times. The method also includes prioritizing one or more host commands from amongst the plurality of host commands for completion, the one or more host commands having corresponding logical addresses belonging to the one or more regions, thereby (i) minimizing risk to data and (ii) releasing resources corresponding to the one or more regions.

20 Claims, 5 Drawing Sheets

ACTIVE TIME-BASED COMMAND PRIORITIZATION IN DATA STORAGE DEVICES

BACKGROUND

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), secure digital (SD) cards, and the like. A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

Zoned namespace (ZNS) is an SSD namespace architecture in which the non-volatile memory is divided into fixed-sized groups of logical addresses, or zones. Each zone is used for a specific application. For example, the host may write data associated with different applications in different zones. Zones are spread across a single die, with each zone generally spanning 48 MB or 64 MB of size. The flash storage device interfaces with the host to obtain the defined zones, and maps the zones to blocks in the flash memory. Thus, the host may write separate application-related data into separate blocks of flash memory.

Traditionally, data in a flash storage device may be invalidated in small chunks (e.g., 4 KB of data), for example, when a host overwrites the data. To remove the invalidated data from the flash memory, the flash storage device performs a garbage collection (GC) process in which valid data may be copied to a new block and the invalidated data is erased from the old block. However, in ZNS, a zone is sequentially written before the data in the zone is invalidated, and thus the entire zone may be invalidated at once (e.g., 48 or 64 MB of data). This feature of ZNS reduces or eliminates GC, which in turn reduces write amplification (WA). As a result, ZNS may optimize the endurance of the flash storage device, as well as improve the consistency of input/output (I/O) command latencies.

There are architectures similar to ZNS for managing regions of data, such as explicit streams or region management. Both ZNS and other data-placement systems (such as Open Channel) use a mechanism in which the host may implicitly or explicitly open a specific range for write, which may be mapped to an open block or to a holding buffer. In non-ZNS advanced data-placement, a region may be written in any order, and closed by the host or by a timeout. Once closed, a region is expected to stay immutable, although the host is permitted to overwrite it at any time, incurring a cost in write amplification. Both regions and zones have a limited open lifetime. Once a region or zone is open for longer than the time limit, the device may close it autonomously in order to maintain resource availability. Host-managed streaming systems allow out of order writes within each provided region. Hence, the system may have single-level cell (SLC) buffers for region writes and then flush to capacity blocks on closure. The maintenance of open blocks is difficult compared to closed blocks because of the possibility of data risk in such blocks. Thus, there is a need for efficient closure of blocks.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

A detailed description will be made with reference to the accompanying drawings.

DETAILED DESCRIPTION

Figure 1:
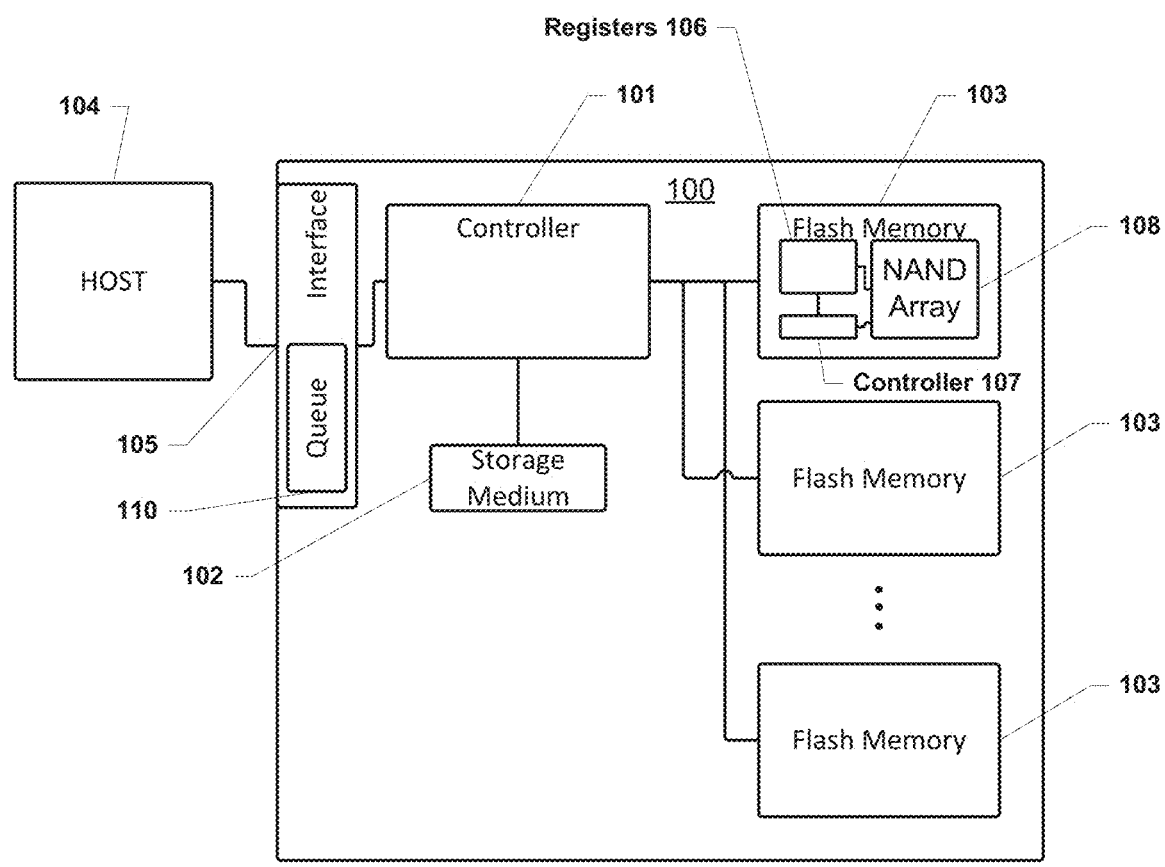
FIG. 1 is a block diagram illustrating components of an example data storage system, according to one or more embodiments.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology. Like components are labeled with identical element numbers for ease of understanding.

The present description relates in general to data storage systems and methods, and more particularly to, for example, without limitation, providing active time-based command prioritization in data storage devices, including, for example, host-managed stream devices.

As discussed above, there is a need for efficient closure of blocks. The ZNS model as defined in non-volatile memory express (NVMe) does not require a specific operating model for a data storage device but is designed to optimize host behavior towards a certain level of sequential access in order to reduce write amplification. There are a number of device implementation models. For example, with many small open zones, zones are sized to internal structures, such as a die-block, and are typically separated out into capacity storage after being first written to an intermediate buffer such as SLC. A closed zone may reside in quad-level cells (QLCs) or a similar location, and the data storage device allows many open zones. With few large zones, zones are incrementally written to a final location, and the number of zones that can be simultaneously written is limited by the number of parity buffers that can be maintained in parallel. This model may also include a zone random write area (ZRWA) stored in dynamic random access memory (DRAM) or in SLC. Some systems may use other methods to manage regions of data, such as explicit streams or region management. Host-managed data placement systems use a mechanism in which the host may implicitly or explicitly open a specific range for write, which may be mapped to an open block or to a holding buffer. With non-sequential zoning systems (e.g., Open Channel), a region may be written in any order, and closed by the host or by a timeout. Once closed, it is expected to stay immutable, although the host is permitted to overwrite it at any time, incurring a cost in write amplification. Both regions and zones have a limited open lifetime. Once a region or zone is open for longer than the time limit, the data storage device may close it autonomously in order to maintain resource availability. Host-managed streaming systems may allow out of order writes within each provided region. Hence, the data storage device would have SLC buffers for region writes and then flush to capacity blocks on closure. The region writes may be cached in buffers (e.g., SLC buffers). Any out of order data can be written here. When the out of order data is moved to capacity blocks (e.g., TLC), the data may be arranged in order prior to writes. The maintenance of open blocks is difficult compared to closed blocks owing to possibility of data risk in such blocks. Hence, a storage system needs to get the blocks to closure as soon as possible. The data storage system described herein may use a region open time limit exceeded condition (i.e., a region open time exceeds a predetermined threshold) to enable quick closure of the buffers to release them back to system. The zones in ZNS devices are similar to regions in other host-data placement models. In the description that follows, zones and regions may be used interchangeably, and the techniques described herein are applicable to host-managed data placement protocols.

A data storage system may select commands from a submission queue based on arbitration as per NVMe specification. In one aspect, the data storage system may maintain a table with active time against open regions/zones that may be used by a controller of the data storage system to bias or prioritize certain commands according to their match against entries in active-zone or region list.

One or more implementations of the subject technology provide several performance benefits that improve the functionality of a computer. By prioritizing commands received from a host based on active regions, the data storage device can manage resources better, potentially improving memory performance. In turn, a host computer coupled to the data storage device also receives the benefits of the data storage device's improved performance.

FIG. 1 is a block diagram illustrating components of an example data storage system, according to aspects of the subject technology. A data storage system may be sometimes referred to as a system, a data storage device, a storage device, or a device. As depicted in FIG. 1, in some aspects, a data storage system 100 (e.g., a solid-state drive (SSD)) includes a data storage controller 101, a storage medium 102, and a flash memory array including one or more flash memory 103. The controller 101 may use the storage medium 102 for temporary storage of data and information used to manage the data storage system 100. The controller 101 may include several internal components (not shown), such as a read-only memory, other types of memory, a flash component interface (e.g., a multiplexer to manage instruction and data transport along a serial connection to the flash memory 103), an input/output (I/O) interface, error correction circuitry, and the like. In some aspects, the elements of the controller 101 may be integrated into a single chip. In other aspects, these elements may be separated on their own personal computer (PC) board.

In some implementations, aspects of the subject disclosure may be implemented in the data storage system 100. For example, aspects of the subject disclosure may be integrated with the function of the data storage controller 101 or may be implemented as separate components for use in conjunction with the data storage controller 101.

The controller 101 may also include a processor that may be configured to execute code or instructions to perform the operations and functionality described herein, manage request flow and address mappings, and to perform calculations and generate commands. The processor of the controller 101 may be configured to monitor and/or control the operation of the components in the data storage controller 101. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 101 and/or its processor. One or more sequences of instructions may be software stored and read from the storage medium 102, the flash memory 103, or received from a host device 104 (e.g., via a host interface 105). ROM, the storage medium 102, the flash memory 103, represent examples of machine or computer readable media on which instructions/code executable by the controller 101 and/or its processor may be stored. Machine or computer readable media may generally refer to any medium or media used to provide instructions to the controller 101 and/or its processor, including volatile media, such as dynamic memory used for the storage media 102 or for buffers within the controller 101, and non-volatile media, such as electronic media, optical media, and magnetic media.

In some aspects, the controller 101 may be configured to store data received from the host device 104 in the flash memory 103 in response to a write command from the host device 104. The controller 101 is further configured to read data stored in the flash memory 103 and to transfer the read data to the host device 104 in response to a read command from the host device 104. A host device 104 may be sometimes referred to as a host, a host system, or a host computer.

The host device 104 represents any device configured to be coupled to the data storage system 100 and to store data in the data storage system 100. The host device 104 may be a computing system such as a personal computer, a server, a workstation, a laptop computer, a personal digital assistant (PDA), a smart phone, or the like. Alternatively, the host device 104 may be an electronic device such as a digital camera, a digital audio player, a digital video recorder, or the like.

In some aspects, the storage medium 102 represents volatile memory used to temporarily store data and information used to manage the data storage system 100. According to aspects of the subject technology, the storage medium 102 is random access memory (RAM), such as double data rate (DDR) RAM. Other types of RAMs may be also used to implement the storage medium 102. The memory 102 may be implemented using a single RAM module or multiple RAM modules. While the storage medium 102 is depicted as being distinct from the controller 101, those skilled in the art will recognize that the storage medium 102 may be incorporated into the controller 101 without departing from the scope of the subject technology. Alternatively, the storage medium 102 may be a non-volatile memory, such as a magnetic disk, flash memory, peripheral SSD, and the like.

As further depicted in FIG. 1, the data storage system 100 may also include the host interface 105. The host interface 105 may be configured to be operably coupled (e.g., by wired or wireless connection) to the host device 104, to receive data from the host device 104 and to send data to the host device 104. The host interface 105 may include electrical and physical connections, or a wireless connection, for operably coupling the host device 104 to the controller 101 (e.g., via the I/O interface of the controller 101). The host interface 105 may be configured to communicate data, addresses, and control signals between the host device 104 and the controller 101. Alternatively, the I/O interface of the controller 101 may include and/or be combined with the host interface 105. The host interface 105 may be configured to implement a standard interface, such as a small computer system interface (SCSI), a serial-attached SCSI (SAS), a fiber channel interface, a peripheral component interconnect express (PCIe), a serial advanced technology attachment (SATA), a universal serial bus (USB), or the like. The host interface 105 may be configured to implement only one interface. Alternatively, the host interface 105 (and/or the I/O interface of controller 101) may be configured to implement multiple interfaces, which may be individually selectable using a configuration parameter selected by a user or programmed at the time of assembly. The host interface 105 may include one or more buffers for buffering transmissions between the host device 104 and the controller 101. The host interface 105 (or a front end of the controller 101) may include a submission queue 110 to receive commands from the host device 104. For input-output (I/O), the host device 104 may send commands, which may be received by the submission queue 110 (e.g., a fixed size circular buffer space). In some aspects, the submission queue may be in the controller 101. In some aspects, the host device 104 may have a submission queue. The host device 104 may trigger a doorbell register when commands are ready to be executed. The controller 101 may then pick up entries from the submission queue in the order the commands are received, or in an order of priority.

The flash memory 103 may represent a non-volatile memory device for storing data. According to aspects of the subject technology, the flash memory 103 includes, for example, a NAND flash memory. The flash memory 503 may include a single flash memory device or chip, or (as depicted in FIG. 1) may include multiple flash memory devices or chips arranged in multiple channels. The flash memory 103 is not limited to any capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 103 is used to access one or more internal registers 106 and an internal flash controller 107 for communication by external devices (e.g., the controller 101). In some aspects, the registers 106 may include address, command, and/or data registers, which internally retrieve and output the necessary data to and from a NAND memory cell array 108. A NAND memory cell array 108 may be sometimes referred to as a NAND array, a memory array, or a NAND. For example, a data register may include data to be stored in the memory array 108, or data after a fetch from the memory array 108 and may also be used for temporary data storage and/or act like a buffer. An address register may store the memory address from which data will be fetched to the host device 104 or the address to which data will be sent and stored. In some aspects, a command register is included to control parity, interrupt control, and the like. In some aspects, the internal flash controller 107 is accessible via a control register to control the general behaviour of the flash memory 103. The internal flash controller 107 and/or the control register may control the number of stop bits, word length, receiver clock source, and may also control switching the addressing mode, paging control, coprocessor control, and the like.

In some aspects, the registers 106 may also include a test register. The test register may be accessed by specific addresses and/or data combinations provided at the interface of flash memory 103 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of the flash memory 103 (e.g., read levels) to dynamically vary how data is read from the memory cells of the memory arrays 108. The registers 106 may also include one or more data latches coupled to the flash memory 103.

It should be understood that in all cases data may not always be the result of a command received from the host 104 and/or returned to the host 104. In some aspects, the controller 101 may be configured to execute a read operation independent of the host 104 (e.g., to verify read levels or BER). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The controller 101 may perform the operations identified in blocks 402-418 and/or blocks 502-506. The controller 101 may cause the operations identified in blocks 402-418 and/or blocks 502-506 to occur, or the controller 101 may provide instructions to cause or facilitate the controller 107 (and the registers 106) to perform operations identified in blocks 402-418 and/or blocks 502-506.

Figure 2:
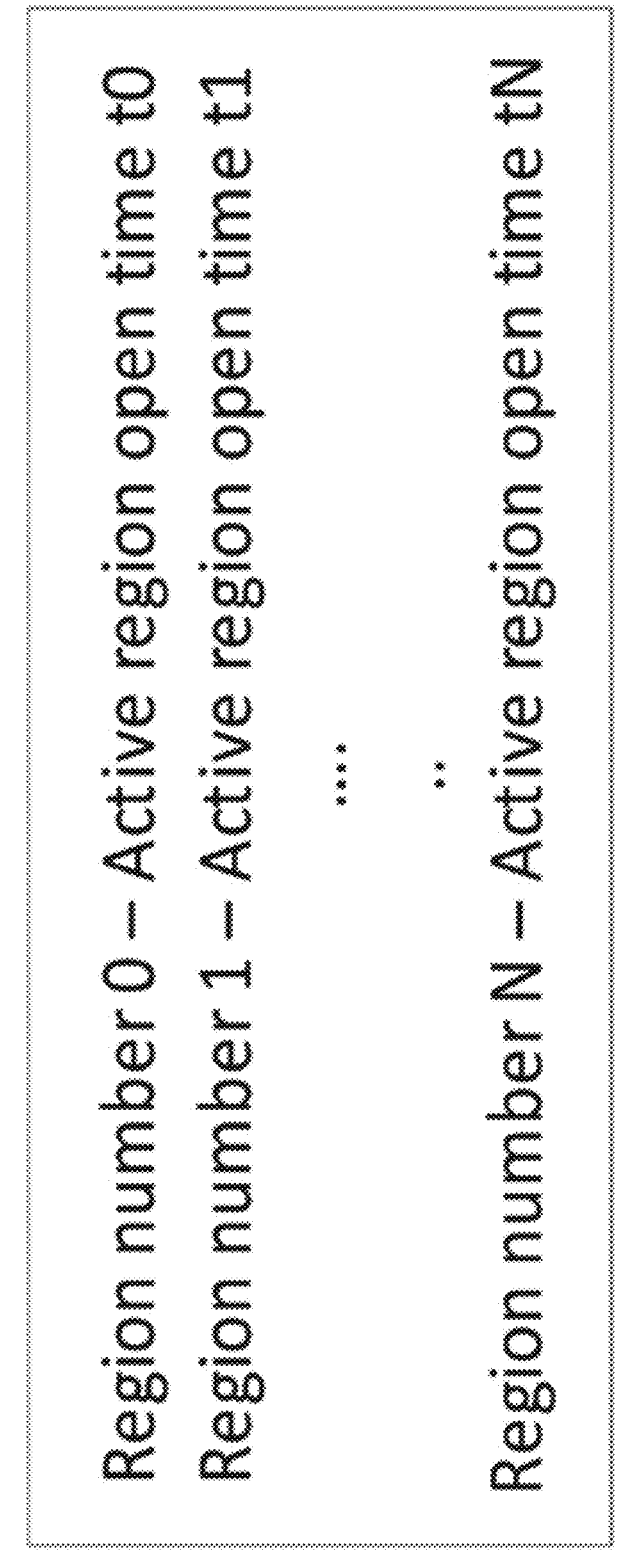
FIG. 2 shows an example table for elapsed region open times, according to one or more embodiments.

FIG. 2 shows an example table 200 for elapsed region open times, according to one or more embodiments. The table (sometimes referred to as a region active table or a zone active table) may be used to store region numbers (e.g., region number 0, . . . , region number N) and a corresponding active region open time for each region. For the example shown in the table in FIG. 2, open time t0, open time t1, . . . , open time tN, correspond to region number region number 1, . . . , region number N, respectively. In some aspects, the table 200 may be configured to store a health index of one or more regions. In some aspects, the controller 101 may be configured to use different system time thresholds for zone open for different zones, based on various parameters, such as health and performances of those zones, which may also be stored as a part of the zone active table (e.g., the region active table 200).

Figure 3:
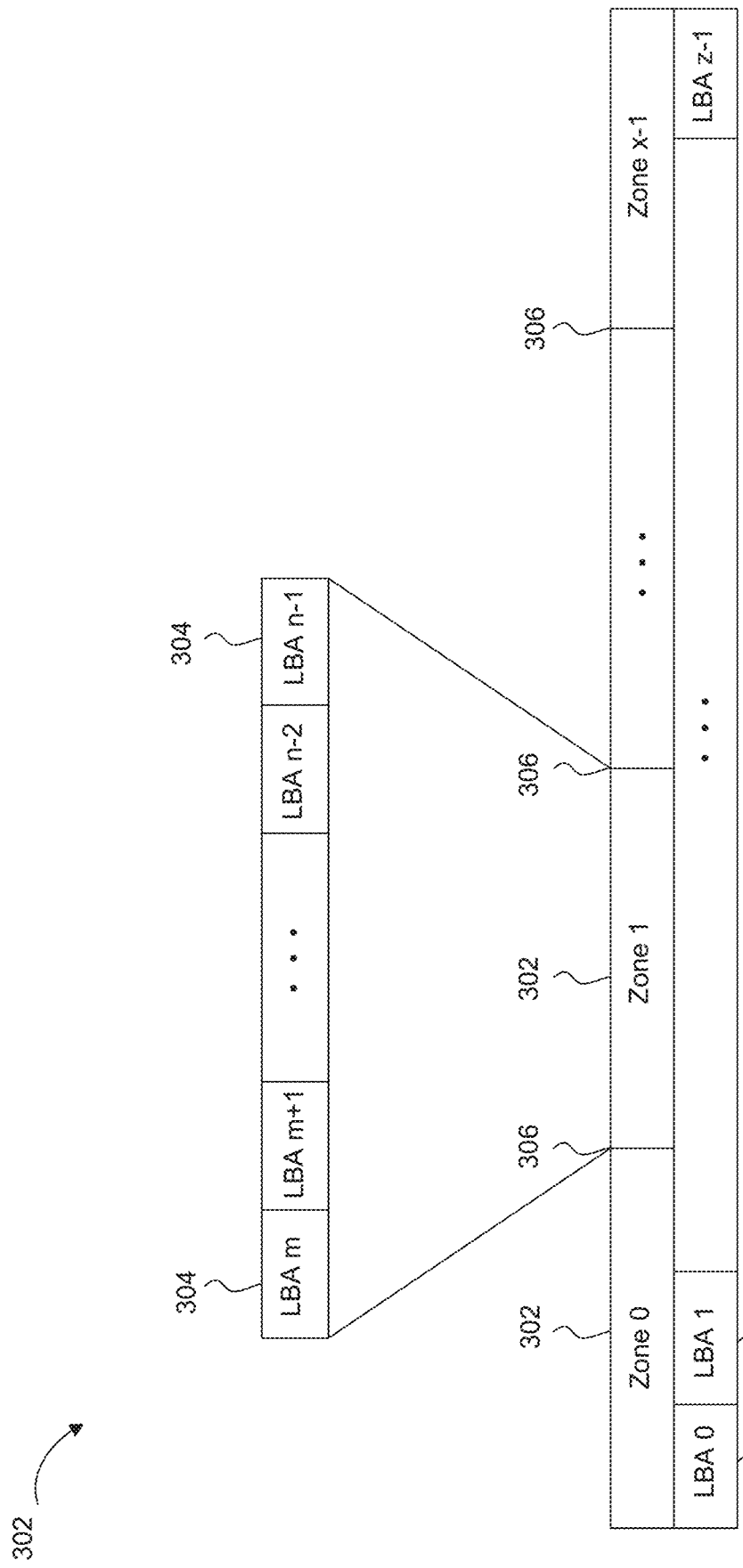
FIG. 3 illustrates a conceptual diagram of an example of zones, according to one or more embodiments.

FIG. 3 illustrates a conceptual diagram 300 of an example of zones 302, according to one or more embodiments. Each zone 302 may be fixed in size and may include a contiguous range of sequential logical addresses 304 in the flash memory 103. For instance as illustrated, the flash memory 103 may include a total of z logical block addresses (LBAs) that are divided into x zones, with each zone including a range of n-m sequential LBAs, where z represents the total number of sectors in flash memory, x represents the number of zones, m represents a first logical block address (LBA) in a zone, and n represents a last LBA in the same zone. Each zone may be separately used by the host for storing data associated with one or more applications run by the host. Thus, the host 104 may divide the LBAs into a number of zones depending on the number of applications.

When writing data to zones 302, the controller 101 may first issue a zone write command to initiate writing to a zone, followed by one or more zone append commands to subsequently write to that zone. For example, if one of the zones 302 includes LBAs 0-1023 and each LBA represents 512 bytes, the host 104 may initially send a command to the controller to write 256 KB of data in LBAs 0-511 (which the controller may execute using a zone write command), and the host may subsequently send one or more commands to the controller to write another 256 KB of data in LBAs 512-1023 (which the controller may execute using one or more zone append commands). Similarly, if another of the zones 502 includes LBAs 1024-2047, the host may initially request the controller to write 256 KB of data in LBAs 1024-1535, and subsequently to write 256 KB data in LBAs 1536-2047. If the host attempts to overwrite a previously written LBA in a partially written zone (for instance, if the host attempts to write data again to LBAs 0-511 without completing LBAs 512-1023), the controller 101 may abort the command as an invalid write. Thus, the host 104 may be constrained by ZNS to write data sequentially in each of the zones 302.

Similarly, when reading data in zones 302, the controller 101 may read the data sequentially in each zone. For example, where one of the zones 302 includes LBAs 0-1023 and each LBA represents 512 bytes, the host 104 may similarly send a command to the controller to read 256 KB of data from LBAs 0-511, and the host may subsequently send one or more commands to the controller to read 256 KB of data from LBAs 512-1023. Likewise, where another of the zones 502 includes LBAs 1024-2047, the host 104 may initially send a command to the controller to read data from LBAs 1024-1535, and the host may subsequently send one or more commands to the controller to read data from LBAs 1536-2047.

The controller 101 may also be configured by the host 104 to read data across zone boundaries 306. For example, the controller may check a configuration register stored in the flash memory 103 to determine whether reading across zone boundaries 306 is permitted or not. For example, the controller may check for a read across zone boundaries bit in a zoned namespace command set specific identify namespace data structure received from the host 104. Depending on the value of the bit, the controller 101 may permit read operations that specify an LBA range containing logical blocks in more than one of the zones 302. For example, where one of the zones 302 includes LBAs 0-1023 and another of the zones 302 includes LBAs 1024-2047, and the host 104 sends a read command to read data in LBAs 0-1535 (across the boundary 306 of the respective zones), the controller may successfully read the data if the read across zone boundaries bit is set (e.g., a value of 1). Otherwise, if the read across zone boundaries bit is reset (e.g., a value of 0), the controller may abort the command as an invalid read with a zone boundary error. Thus, the host may be constrained by ZNS to read data sequentially within a defined zone.

Figure 4:
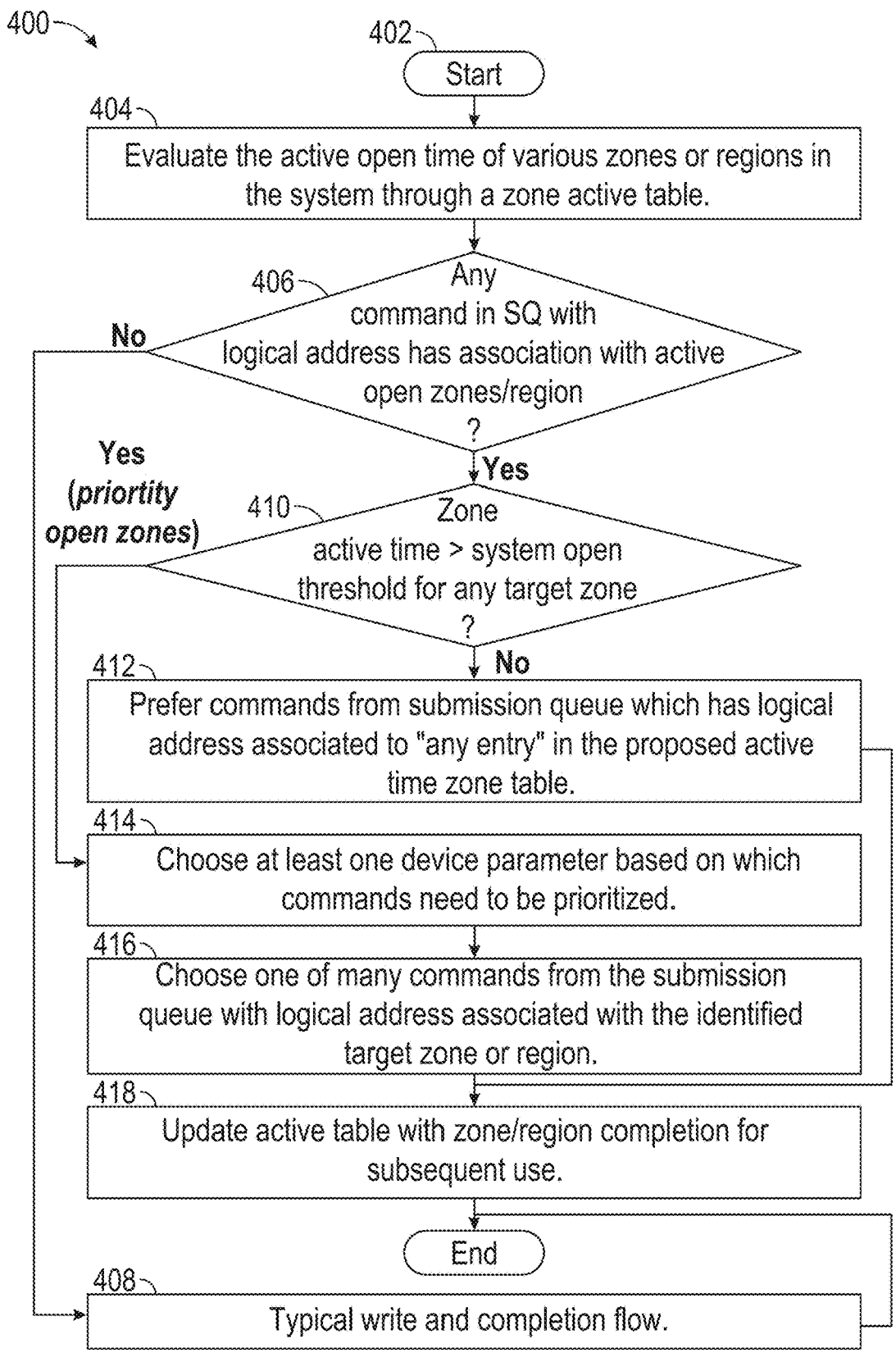
FIG. 4 is a flowchart of an example method for active time-based command prioritization in data storage devices, according to one or more embodiments.

FIG. 4 is a flowchart of an example method 400 for active time-based command prioritization in data storage devices such as host-managed stream devices, according to one or more embodiments. The method may be performed (402-418) by a controller (e.g., the controller 101) of a data storage device or system (e.g., the system 100). The controller 101 may evaluate (404) the active open times of various zones or regions in the system through a zone active table (e.g., the table shown in FIG. 2). The controller may determine (406) if any command in a submission queue corresponds to a logical address that is associated with any active open zone or region. If not, then the controller may perform (408) typical write and completion flow for the commands in the submission queue (e.g., without applying any prioritization described above). On the other hand, if there is a command in the submission queue that corresponds to a logical address that is associated with an active open zone or region, then the controller 101 may determine (410) if the zone's active time is greater than a system open threshold for any target zone (or region) (i.e., a zone or region targeted by a host command in the submission queue). If the zone's active time is not greater than the system open threshold for any target zone (or region), the controller 101 may prefer (412) commands from the submission queue that have logical addresses associated with any entry in the active time zone table. If the zone (or region) active time is greater than a system open threshold for any target zone (or region), then the controller 101 may select (414) at least one device parameter based on which commands need to be prioritized, and/or select (416) one of many commands from the submission queue with a logical address associated with the identified target zone or region. Subsequently, the controller may update (418) the active table with zone/region completion for subsequent use.

Figure 5:
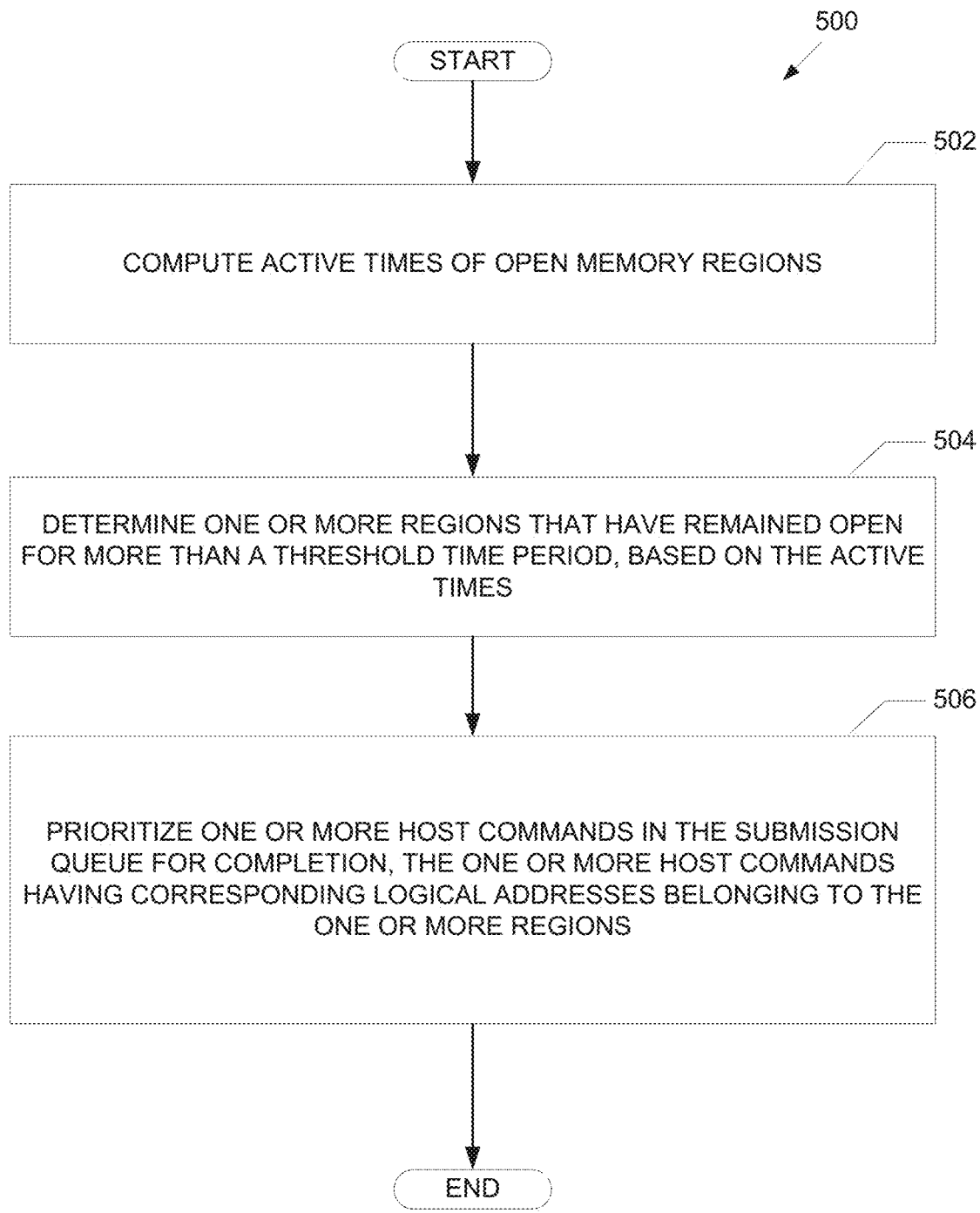
FIG. 5 is a flowchart illustrating an example process for active time-based command prioritization in data storage devices, according to one or more embodiments.

It may be instructive to describe the structures shown in FIGS. 1, 2 and 3 with respect to FIG. 5, a flowchart illustrating an example process 500 for active time-based command prioritization in data storage devices such as host-managed stream devices, according to one or more embodiments. One or more blocks of FIG. 5 may be executed by a computing system (including, e.g., a controller of a flash memory, a data storage controller of a data storage system or a solid state storage device (SSD), a processor, or the like). Example of a computing system or a controller may be the controller 101. Similarly, a non-transitory machine-readable medium may include machine-executable instructions thereon that, when executed by a computer or machine, perform the blocks of FIG. 5. The steps of process 500 may be implemented as hardware, firmware, software, or a combination thereof. For example, a data storage device (e.g., the storage device 100) includes a submission queue for receiving host commands from a host system. The data storage device also includes a controller (e.g., the controller 101). The controller is configured to compute (502) active times of open memory regions in a device memory of the data storage device. These open memory regions may be referred to as open zones or open logical blocks. When a zone open request arrives (e.g., received by the storage device 100 or the controller 101 from the host 10), the controller 101 may open a block in the storage device and write data to the block. The controller 101 may also trigger a timer. For example, when a block is open, that time corresponds to time 0 for that block and then the timer continues. Opening a block may correspond to opening a logical block which may in turn correspond to a physical block in the flash memory 103. In some aspects, the controller may be configured to obtain a snapshot of a device timer when the block is opened; the controller may populate a table (e.g., table 200) with that snapshot. The controller may use the table to evaluate the elapsed time by comparing the table entry to the current snapshot of the running timer. The block may be partially written (i.e., there may be data remaining to be written) and the device may be waiting for data to be written; after data is written, the block is subsequently closed. The elapsed time since the timer was triggered is the block open time. The controller 101 may also be configured to: determine (504) one or more regions that have remained open for more than a threshold time period, based on the active times; and prioritize (506) one or more host commands in the submission queue for completion, the one or more host commands having corresponding logical addresses belonging to the one or more regions, thereby (i) minimizing risk to data and (ii) releasing resources corresponding to the one or more regions. Longer the open time for a block, higher the chances of errors in flash memory for that block. So the controller 101 strives to close blocks which have crossed a system threshold. Further, the backend resources, especially random access memory (RAM) is committed for the open zones which are associated with a zone until that zone is closed. Hence, closing blocks helps efficiently release the backend resources as well.

In some aspects, the controller 101 may be further configured to prioritize the one or more host commands further based on endurance groups. The device may bias commands in the submission queue based on the endurance group that the command is associated with. For example, the controller may positively bias a command associated to a high endurance group compared to a command associated to a low endurance group, since open blocks have poor endurance and proactively closing a physical block helps maintain the endurance of the region.

In some aspects, the controller 101 may be further configured to prioritize the one or more host commands further based on host block types targeted by the host commands. For example, the types may be SLC which is a logical block formed from multiple physical blocks working in a SLC mode (single bit per cell), or a triple-level cell (TLC) block formed from interleaving multiple physical blocks in a TLC mode (multi-level cells per bit). The execution order could be biased based on the designated block, such as SLC versus TLC versus QLC blocks. The controller 101 may give higher priority to SLC-targeted commands as quick execution of such commands may be more critical for the host.

In some aspects, the controller 101 may be further configured to prioritize the one or more host commands further based on a data rate of streams associated with the host commands. For example, on determining that the command associated with a particular stream ID is filling data at a higher rate, the controller 101 may choose to execute such commands on priority to release the open block resources quickly. For example, audio/video media data with higher bit rate can fill a block quicker than a sensor data such as ultrasonic data (whose data rate and frequency of write is very less), and hence, the controller 101 may prioritize high bit rate commands in the submission queue when it comes to releasing resources quickly.

In some aspects, the controller 101 may be further configured to prioritize the one or more host commands further based on weighting type of logical data, data rate, frequency of writes, endurance group, associated with the host commands. A goal may be to close aged open regions actively based on the managed table, so the endurance group and the data rate of a stream identifier (ID) can be used as another set of parameters to weigh the queued commands and determine the optimal execution order. The weights may be based on the application. If the data associated with an application has more endurance requirements, then other parameters may be left out or corresponding weights may be reduced, and endurance may be weighted more.

In some aspects, the controller 101 may be further configured to prioritize the one or more host commands further based on a level of physical block interleaving. The regions with higher physical block interleaving may have more open physical blocks than regions of the same size with lower physical block interleaving. That is, the region interleaved with many physical blocks may win the arbitration, when it comes to picking commands from a submission queue. Thus, the controller 101 may enable quick closure of multiple physical blocks for the same region sizes. This is beneficial for systems where the open blocks are capacity blocks. Higher the interleaving means more dies are interleaved together to form a logical block and that means more dies can work in parallel, and that means higher quality-of-service (QoS) for reads and writes. So prioritizing the zones with higher block interleaving may help provide better QoS for zones with higher interleaving, and/or release more resources back (so that they are available to be utilized by the controller 101) when the block closes.

In some aspects, the controller 101 may also perform quick closure of active blocks, thereby releasing hardware resources attached to the blocks to the backend for subsequent use. The released resources may add more bench strength in host data placement-aware devices. Bench strength is the margin resources that a backend of the data storage device 100 has to start a task. If resources are released early, then the backend has more margins to start tasks needed for bookkeeping or any host commands which otherwise may be delayed. Bench strength may also be understood as the resource margin available for the device to use. The released resources would add up to the free resources, and hence, there may be an increased margin for the device to use as the case may demand.

In some aspects, the controller 101 may be further configured to prioritize the one or more host commands further based on whether commands have a data size that is sufficient to complete a target SLC buffer thereby enabling quick closure of the one or more regions. This may be useful for those systems where the open blocks are SLC buffer blocks.

In some aspects, the data storage device 100 may include a plurality of device memories (e.g., the flash memories 103) and a plurality of submission queues. Each submission queue may be associated with a respective device memory. The controller 101 may be further configured to prioritize host commands with logical addresses belonging to the one or more regions, in the plurality of submission queues. The controller 101 may be further configured to trigger the active time-based prioritization separately in each of the submission queues to honor their arbitration weightage. That is, given a submission queue, multiple commands in the submission queue may be arbitrated against the active time zone table, and the controller 101 may prioritize those commands that will target open zones/regions such that they will allow for faster closure of the relevant structure for open blocks (e.g., resources associated with open blocks, such as RAM, flash channel bandwidth).

In some aspects, the controller may be further configured to prioritize the one or more host commands further based on data transfer from SLC to TLC in order to close TLC/QLC blocks sooner. Such prioritization may be based on an LBA, stream ID, namespace (e.g., logical unit number (LUN)) or other logic which the controller 101 may determine. The terms controller, device and drive may be sometimes used interchangeably herein.

In some aspects, the controller 101 may be further configured to: generate a region active table (e.g., the table shown in FIG. 2) that stores the open times (active times are sometimes referred to as open times); determine the one or more regions based on the region table; and update the table after processing a host command in accordance with a determination that the host command corresponds to a completed region. Open times are sometimes referred to as active open times. Active open time means the time the blocks are open. Such blocks are also called active blocks since these are the blocks that receive and store data. Data can be written only to open blocks. The region referred to here is a logical region which is associated with a host command. For example, write LBA 0-1023 means write of 1 kilobyte (KB) sectors in the logical region 0-512 KB (an LBA is also called a sector which is 512 bytes). Host commands are associated with the regions. The controller 101 may determine that a region is completed when a block is fully written. For example, the controller 101 (e.g., a flash translation layer or FTL in the controller 101) may determine the start of the block, and may track the write offset when the block is being written and the end of the block when the write offset reaches a maximum logical block size.

In some aspects, the controller 101 performs computing the active times, determining the one or more regions, and/or prioritizing the one or more host commands, are performed for a specific target region in a device memory. Since zones are open in the device (for which writes happened) and the zones are logical blocks, the device knows which logical regions (writes) are pending to complete an open zone (e.g., complete the partially written block to close it). So the device knows which regions are pending; such regions are the target regions. The controller 101 may target to close the open zones in an order which is beneficial to the system since some of them would be open for a long time, longer than safe time margins. The safe time margin may be an elapsed time until which open blocks are still reliable.

In some aspects, the controller 101 is configured to determine the one or more regions by determining if the specific target region has remained open for more than the threshold time period. The threshold time period may be a system-defined threshold time based on the flash health used for storage. This threshold may be different for SLC and TLC blocks. The threshold may also be different for different technology nodes of memory. The threshold may be a memory design driven parameter used by the controller.

In some aspects, the controller 101 may be further configured to, in accordance with a determination that there are no regions that have remained open for more than a threshold time period, select any host command in the submission queue with an associated logical address belonging to an open memory region.

In some aspects, the controller 101 may be further configured to use different threshold time periods for different memory regions. The safe time margin (described above) may be different for different blocks. For example, SLC logical blocks or SLC zones are a safe bet in terms of endurance since they have higher reliability owing to storage of only 1 bit per cell (chances of error are less) when compared to their TLC counterparts. In some aspects, the different threshold time periods are determined based on health and performance of the memory regions. For example, a SLC block may be handled differently than a TLC block. In general, SLC block is healthier than a TLC block for reasons described above. Further, this health may be a dynamic aspect. As program to erase count (PEC) increases, the health diminishes and the controller 101 may consider other factors to evaluate overall health. For example, as the PEC increases, the flash memory wears out, and this may be sometimes referred to as aging which is associated with the health of the flash memory.

In some aspects, the controller 101 may be further configured to dynamically bias selection of host commands from the submission queue for region closure over a lifetime of a device memory targeted by the host commands, based on parity error. For example, when the device/zone is young (e.g., the device/zone has a lower PEC), active open zones may not have a big impact (and the controller may use a soft approach. For example, when a block is young, the block's PEC may be lower; as a result, the adverse effects of the open conditions are not as significant as compared to the adverse effects of the open conditions on a block with a higher PEC. The soft approach may include modifying a state machine. For example, the controller may wait to close the block and give the quota to another block since this block is healthy. On determining that the PEC of the zones is higher than a threshold, the controller 101 may apply the techniques described herein with force. For example, the controller may change the state machine when a condition is met without considering other state machine parameters.

In some aspects, the data storage device is a host-managed stream device. In host-managed stream devices, the host explicitly configures the internal blocks of the device memory as zones to use the device memory according to its own logic, contrary to typical system where the host does not interfere with internal logic of the data storage device. In host-managed stream systems, a zone is a logical blocks whose physical association to a physical block is known to host. For systems that are not host-managed streams, the device is free to route any data to any open block (no zone standards). Typically number of open blocks in such systems is less (e.g., 3-5) and hence not a significant issue when compared to ZNS type of devices where number of open blocks may run into hundreds. In some aspects, the host commands target one or more device memories that are configured to support ZNS and the memory regions correspond to zones.

The techniques described herein are particularly useful in ZNS devices, which has open block issues (a block is susceptible to NAND errors if not closed with a period of time which is an inherent design or manufacturing issue), and possibility of multiple open zones. The techniques are also useful generally in any device where the device routes data against its normal routing policies (ignoring the sequential/randomness of data) to close a block open for more than a threshold time, through routing different data to those blocks. Typically, sequential data is routed to sequential logical blocks, and random data to random blocks. Also, number of open blocks in systems that are not host-managed are typically lower. For the sake of closing blocks, the controller may route against this policy, for example, route some random data to sequential blocks on determining that the sequential blocks is almost full and only needs some data to get closed, if the block is open for a threshold time.

In some aspects, the host commands do not require the write order to be preserved. The controller may support a host data placement protocol other than ZNS, in which a stream or region does not require strict ordering. Typically, randomly written data may be buffered in SLC. Data which is sequentially written may be routed directly to capacity blocks or buffered in SLC. When a region is closed, the region may be compacted into capacity blocks such that the region is stored in an optimal fashion.

In some aspects, the controller 101 may be configured to process commands from submission queues with priority on those commands that are associated with logical addresses of aged active open regions. There may be several submission queues for a single storage controller. The storage controller may treat several flash memories as a single logical space. The logical addresses may be either LBAs associated with a region in non-sequential zoning system or zone write LBAs. The controller 101 may manage a table (e.g., the table 200) which tracks the active time of the open regions. The controller 101 may then use that table to determine what regions have crossed a system threshold, and what commands with logical addresses (or Zone LBA with ZNS) are preferred to be chosen from the submission queue in that priority order. Zone numbers or Zone LBA in a Zone SSD may be similar to logical block addresses in legacy SSDs. The regions that are active open for longer duration as per the table may win the arbitration and associated commands in the submission queue may be processed on priority. A goal is to close the aged open regions actively, thereby minimizing device overhead if the open time limit has exceeded for any regions.

The controller 101 may be configured to determine the type of logical data and evaluate the associated data rate, frequency of writes to bias any command execution order. The endurance group and the data rate of a stream can be used as another set of parameters to weigh the queued commands and determine the optimal execution order.

The controller 101 may be configured to determine the command execution order based on the endurance group, destination block type, and/or data rate parameters, with or without consideration of the active region time limit.

In some aspects, the controller 101 may be configured to use different system time thresholds for zone open for different zones, based on various parameters, such as health and performances of those zones, which may also be stored as a part of the zone active table (e.g., the region active table 200).

The techniques described herein are particularly useful in ZNS devices, which has open block issues, and possibility of multiple open zones. In general, these techniques may be used in any device where the device routes data against its normal routing policies (ignoring the sequential or randomness of data) to close a block open for more than a threshold time, through routing different data to those blocks.

Various examples of aspects of the disclosure are described below. These are provided as examples, and do not limit the subject technology.

One or more aspects of the subject technology provide a data storage device that may include a submission queue for receiving host commands from a host system, and a controller. The controller may be configured to: compute active times of open memory regions; determine one or more regions that have remained open for more than a threshold time period, based on the active times; and prioritize one or more host commands in the submission queue for completion, the one or more host commands having corresponding logical addresses belonging to the one or more regions, thereby (i) minimizing risk to data and (ii) releasing resources corresponding to the one or more regions In other aspects, methods are provided for active time-based command prioritization in host-managed stream devices. According to some aspects, a method may be implemented using one or more controllers for one or more data storage devices. The method may include: receiving a plurality of host commands from a host system; computing active times of open memory regions; determining one or more regions that have remained open for more than a threshold time period, based on the active times; and prioritizing one or more host commands from amongst the plurality of host commands for completion, the one or more host commands having corresponding logical addresses belonging to the one or more regions, thereby (i) minimizing risk to data and (ii) releasing resources corresponding to the one or more regions.

In further aspects, a system may include: means for means for receiving a plurality of host commands from a host system; means for computing active times of open memory regions; means for determining one or more regions that have remained open for more than a threshold time period, based on the active times; and means for prioritizing one or more host commands from amongst the plurality of host commands for completion, the one or more host commands having corresponding logical addresses belonging to the one or more regions, thereby (i) minimizing risk to data and (ii) releasing resources corresponding to the one or more regions.

Disclosed are systems and methods providing active time-based prioritization in host-managed stream devices. Thus, the described methods and systems provide performance benefits that improve the functioning of a storage device.

It is understood that other configurations of the subject technology will become readily apparent to those skilled in the art from the detailed description herein, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A data storage device, comprising:
   a submission queue for receiving host commands from a host system; and
   a controller configured to:
   compute active times of open memory regions;
   determine one or more regions that have remained open for more than a threshold time period, based on the active times; and
   prioritize one or more host commands in the submission queue for completion, the one or more host commands having corresponding one or more logical addresses belonging to the one or more regions.

2. The data storage device of claim 1, wherein the controller is further configured to:
   prioritize the one or more host commands further based on endurance groups.

3. The data storage device of claim 1, wherein the controller is further configured to:
   prioritize the one or more host commands further based on host block types targeted by the host commands.

4. The data storage device of claim 1, wherein the controller is further configured to:
   prioritize the one or more host commands further based on a data rate of streams associated with the host commands.

5. The data storage device of claim 1, wherein the controller is further configured to:
   prioritize the one or more host commands further based on weighting type of logical data, data rate, frequency of writes, endurance group, associated with the host commands.

6. The data storage device of claim 1, wherein the controller is further configured to:
   prioritize the one or more host commands further based on a level of physical block interleaving.

7. The data storage device of claim 1, wherein the controller is further configured to:
   prioritize the one or more host commands further based on whether commands have a data size that is sufficient to complete a target single-level cell (SLC) buffer thereby enabling quick closure of the one or more regions.

8. The data storage device of claim 1, further comprising a plurality of device memories and a plurality of submission queues, each submission queue associated with a respective device memory, wherein the controller is further configured to prioritize host commands with logical addresses belonging to the one or more regions, in the plurality of submission queues.

9. The data storage device of claim 1, wherein the controller is further configured to:
   prioritize the one or more host commands further based on data transfer from SLC to triple-level cell (TLC) or quad-level cell (QLC) in order to close TLC or QLC blocks sooner.

10. The data storage device of claim 1, wherein the controller is further configured to:
    generate a region active table that stores active times;
    determine the one or more regions based on the region active table; and
    update the region active table after processing a host command in accordance with a determination that the host command corresponds to a completed region.

11. The data storage device of claim 1, wherein computing the active times, determining the one or more regions, and/or prioritizing the one or more host commands, are performed for a specific target region in a device memory.

12. The data storage device of claim 11, wherein determining the one or more regions comprises determining if the specific target region has remained open for more than the threshold time period.

13. The data storage device of claim 1, wherein the controller is further configured to:
    in accordance with a determination that there are no regions that have remained open for more than a threshold time period, select any host command in the submission queue with an associated logical address belonging to an open memory region.

14. The data storage device of claim 1, wherein the controller is further configured to:
use different threshold time periods for different memory regions.

15. The data storage device of claim 14, wherein the different threshold time periods are determined based on health and performance of the different memory regions.

16. The data storage device of claim 1, wherein the controller is further configured to:
dynamically bias selection of host commands from the submission queue for region closure over a lifetime of a device memory targeted by the host commands, based on parity error.

17. The data storage device of claim 1, wherein the data storage device is a host-managed stream device, wherein memory regions correspond to zones that are managed by a host coupled to the data storage device.

18. The data storage device of claim 1, wherein the host commands do not require write order to be preserved.

19. A method implemented using one or more controllers for one or more data storage devices, the method comprising:

receiving a plurality of host commands from a host system;
computing active times of open memory regions;
determining one or more regions that have remained open for more than a threshold time period, based on the active times; and
prioritizing one or more host commands from amongst the plurality of host commands for completion, the one or more host commands having corresponding one or more logical addresses belonging to the one or more regions.

20. A system, comprising:
means for receiving a plurality of host commands from a host system;
means for computing active times of open memory regions;
means for determining one or more regions that have remained open for more than a threshold time period, based on the active times; and
means for prioritizing one or more host commands from amongst the plurality of host commands for completion, the one or more host commands having corresponding one or more logical addresses belonging to the one or more regions.

* * * * *